Aug. 15, 1933.  M. H. LEMAIRE  1,922,895
APPARATUS FOR THE LEVELING OF RAILWAYS
Filed Dec. 13, 1928
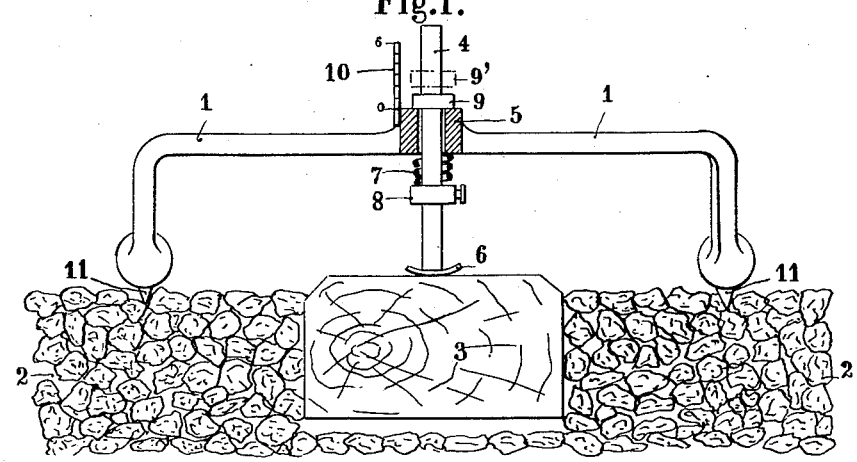
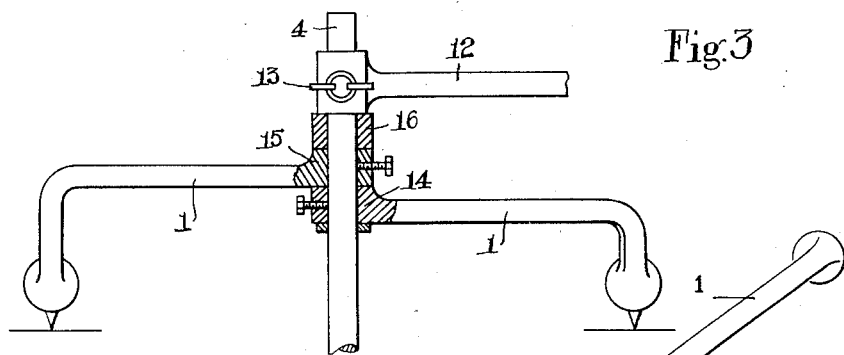
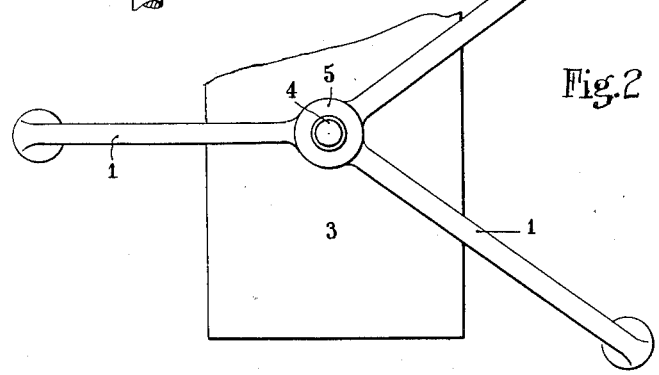
INVENTOR
Maurice Henri Lemaire
by
ATTORNEY Patented Aug. 15, 1933

1,922,895

UNITED STATES PATENT OFFICE 1,922,895

APPARATUS FOR THE LEVELING OF RAILWAYS

Maurice Henri Lemaire, Ermont, France

Application December 13, 1928, Serial No. 325,838, and in France December 13, 1927

2 Claims. (Cl. 33—169)

It is known that it is periodically necessary, for the upkeep of railways, to raise the support of certain series of sleepers in order to obtain a suitable leveling of the track.

The methods at present employed for evaluating the raising necessary are purely empirical because means are not available which will permit of determining with the desirable approximation the height to which it is convenient to raise each sleeper.

The present invention relates to a measuring apparatus which permits of determining, with exactitude, the drop of certain sleepers when a loaded axle passes over them. This determination which is obtained very easily, permits the staff in charge of the leveling of the track to determine the quantity of ballast or gravel which must be introduced under each sleeper.

For this purpose, according to the present invention, an apparatus is used (hereinafter termed a "dansometer") which serves to measure the amount by which a sleeper drops when a train passes over it.

This appliance is shown by way of example in one of the constructional forms, which is a particularly simple one, in the accompanying drawing in which:

Fig. 1 is a view in sectional elevation of the "dansometer" device.

Figure 2 is a view in plane of the same device.

Figure 3 illustrates a foldable tripod which may be used for the device.

In principle, as shown in Figures 1 to 3, the apparatus termed the "dansometer" is composed substantially of a fixed portion resting on the ballast and of a movable portion which accompanies the movements of the sleeper. The maximum amplitude of these movements relative to the position of rest on the sleeper is measured by the aid of a maximum index which moves in front of an element of a fixed portion of the apparatus bearing directly on the ground.

In the example considered, the fixed part of the "dansometer" is constituted by a tripod 1, resting on the ballast 2, astride of the sleeper 3, but not touching it.

The movable portion is composed of a light rod 4, sliding with slight friction in a socket or sleeve provided at the central part 5 of the tripod. This rod is supported either directly, or by a shoe 6, on the upper face of the sleeper and is held in contact permanently therewith by a compressed spring 7 which bears upwards against the lower face of the socket or sleeves 5, and downwards against a shoulder 8 carried by the sliding rod 4.

Above the tripod, the rod carries a light ring 9 sliding with slight friction. The movements of this ring can be measured on a vertical graduated plate 10, fixed to the tripod.

To take a measurement, the observer commences by correctly seating the tripod in the ballast 2, by pushing into this latter the points 11 which terminate the vertical elements of the tripod. Before a train passes by, the ring 9 is brought into contact with the upper face of the central socket or sleeve of the tripod by sliding this ring along the rod 4. When the axles pass at right angles to the sleeper, it drops but recovers after each passage. The rod 4 attracted by the spring 7, accompanies the sleeper in all its movements. When the rod drops, the ring 9, held by the tripod, moves, sliding upwards on the rod. After the train has passed by, the ring remains in the position $9^1$. It has been raised by an amount equal to the maximum amplitude of the dip of the sleeper. This amount can be easily read off on the side graduated rod 10.

As shown in the drawing, in Fig. 3, another modification of "dansometer" device is constituted by an arm 12 capable of horizontally rotating about a vertical rod 4 on which it is locked by a wing nut 13.

The rod 4 can be supported by a tripod as above described. For diminishing the cubersomeness of this support, its three legs lead respectively (Fig. 3) to the superposed rings 14, 15 and 16 in which is introduced the rod 4. A locking device may be adjoined to these legs. For folding up the apparatus, it suffices to cause the legs to rotate about the rod 4 so as to bring them in the same half-plane.

Other modifications and variations may be resorted to within the scope of my invention and parts may be used without others.

Having now fully described my invention and disclosed the manner of using the same to best advantage, I claim:—

1. Gauge for measuring the momentary giving way or sinking of a railroad tie under the load of a train, comprising a tripod driven in the ballast bed on both sides of the tie to be observed so as to stand in a fixed position above said tie, a vertical opening in the center of said tripod, an axially movable rod guided in said opening, a spring acting on said rod so as to maintain the lower end of the same in constant contact with the upper surface of the tie to be observed during the passage of a train over said tie, a ring frictionally adjusted on said rod so as to be kept immovable by said tripod during the downward movement of said rod occurring during the passage of a train and to follow by the action of said friction the upward return movement of said rod which occurs after said passage and a vertical graduated scale carried by said tripod so as to permit the reading of the maximum vertical displacement of said ring with respect to the fixed tripod thus obtained.

2. Gauge for measuring the momentary giving way or sinking of a railroad tie under the load of a train, comprising a tripod driven in the ballast bed on both sides of the tie to be observed so as to stand in a fixed position above said tie, a vertical opening in the center of said tripod, an axially movable rod guided in said opening, a collar adjustably fixed on said rod, a spring acting on said collar so as to maintain the lower end of the same in constant contact with the upper surface of the tie to be observed during the passage of a train over said tie, a ring frictionally adjusted on said rod in abutting relation with the upper surface of said tripod so as to be kept immovable by said tripod during the downward movement of said rod occurring during the passage of a train and to follow by the action of said friction the upward return movement of said rod which occurs after said passage and a vertical graduated scale, having its zero at the level of the upper surface of said tripod and carried by said tripod so as to permit the reading of the maximum vertical displacement of said ring with respect to the fixed tripod thus obtained.

MAURICE HENRI LEMAIRE.